No. 655,111. Patented July 31, 1900.
A. PLECHER.
ELECTROLYTIC APPARATUS.
(Application filed Jan. 20, 1900.)
(No Model.)
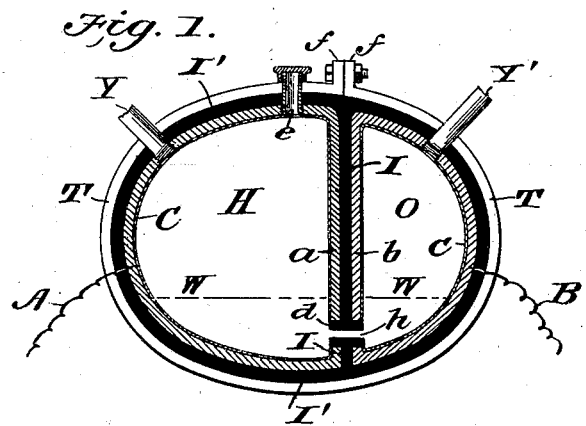
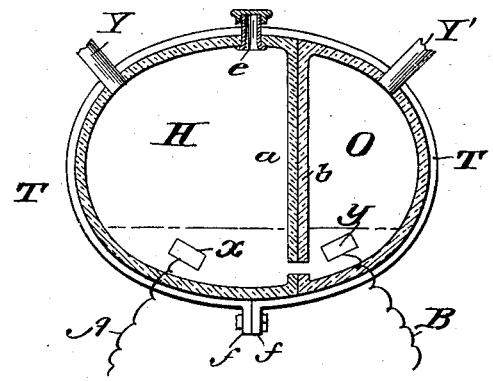
WITNESSES:
M. S. Blondel
Edw. W. Byrn.
INVENTOR
Andrew Plecher.
BY Munn & Co.
ATTORNEYS
THE NORRIS PETERS CO., PHOTO-LITHO., WASHINGTON, D. C.

UNITED STATES PATENT OFFICE.

ANDREW PLECHER, OF SAVANNAH, GEORGIA.

ELECTROLYTIC APPARATUS.

SPECIFICATION forming part of Letters Patent No. 655,111, dated July 31, 1900.

Application filed January 20, 1900. Serial No. 2,167. (No model.)

*To all whom it may concern:*

Be it known that I, ANDREW PLECHER, of Savannah, in the county of Chatham and State of Georgia, have invented a new and useful Improvement in Electrolytic Apparatus, of which the following is a specification.

My invention is in the nature of a novel form of electrolytic apparatus for decomposing any liquid into its constituent gases, and especially for decomposing water into hydrogen and oxygen; and it consists in the novel construction and arrangement of such apparatus which I will now proceed to describe with reference to the drawings, in which—

Figure 1 is a transverse section through the device, and Fig. 2 a similar view of a modification.

H and O are two strong chambers forming a pair of cells whose outer surfaces together form a spheroidal body and whose flat sides $a$ and $b$ are juxtaposed and fitted tightly together, but electrically insulated from each other by a layer I, of hard rubber, glass, or other non-conducting material, which is extended exteriorly also around the cells at I'. These cells are bound tightly together by detachable tires or straps T, which for convenience are provided with flanges $f\,f$, bolted firmly together. At the lower part of the side walls $a$ and $b$, near the bottom of the cells, there are registering openings at $h$, which are preferably joined by a non-conducting bushing $d$.

A and B are conducting-wires which connect, respectively, with the two cells H and O, while Y and Y' are gas-outlet pipes also firmly connected with and communicating with the interior of the two cells H and O, being screwed or otherwise fastened therein. The pipes Y and Y' and conducting-wires A and B must not touch the binding-tire T, as the latter is to be made of metal, and contact therewith would short-circuit the cells. If the binding tire or band T be made as a complete jacket or outer envelop, then both the wires A and B and pipes Y and Y' must pass through insulated bushings in the said outer envelop.

In the top part of one of the cells is a filling-tube $e$, closed by a suitable cap, through which water or other liquid to be decomposed is inserted.

For decomposing water the chambers H and O are made of a size to approximately correspond to the volumetric proportions of the gases entering into its composition. I make, for instance, the chamber H, which receives the hydrogen, to be two-thirds the cubic contents of the apparatus, and the chamber O, which receives the water, one-third the cubic contents of the entire space. The cells, which are made in the shape of two sections of a spheroidal body, are preferably, as shown in Fig. 1, made of metal. The exterior shape and binding-straps are designed to give to the apparatus great capacity to resist internal pressure, for the generation of gases is designed to be run up to very high pressure. The interiors of the chambers H and O are first electroplated with platinum or gold to form an inner lining C, which is not affected by the electrochemical action.

When the apparatus is provided with a quantity of water, it rises to the same level in both, as shown at W W, the water freely passing through one chamber to the other through the communicating openings at $h$. With the apparatus so constructed the chambers H and O themselves form the electrodes, which when the current is turned on through wires A and B cause the water to be decomposed, the hydrogen accumulating in the negative chamber H and the oxygen in the positive chamber O. This saves the expense of having special electrodes of gold or platinum, and the chambers H and O perform the double function of decomposing-electrodes and gas-holders. A further advantage is that as my apparatus is designed for use in a portable way on wheels or otherwise the making of the body of the cells to form the electrodes avoids the uncovering of the electrodes in the tilting or rocking of the apparatus, the greatest possible surface for the electrodes is obtained, and the proper action of the electrodes is not dependent upon any nice adjustment of level. The objects in making the apparatus in two detachable cells are convenience of construction, facility of repairs, and the preservation of one section in case the other becomes cracked or damaged. It furthermore gives protection to the insulation between the cells when the latter are made of metal. As a modification of my invention, however, the chambers H and O may be made of glass, and separate electrodes $xy$, immersed in the water in the respective chambers, are connected to the circuit-wires A and B. In this case the non-conducting insulation I and I' is not necessary.

To promote conductivity and facilitate decomposition, the water is slightly acidulated with sulfuric acid.

Having thus described my invention, what I claim as new, and desire to secure by Letters Patent, is—

1. An electrolytic apparatus of spheroidal shape consisting of two separate closed cells or chambers forming sections of the spheroid with flat sides juxtaposed and having registering openings for intercommunication, and an encompassing band or jacket completely encircling and holding them together, said cells being provided with electrodes and circuit-wires, and gas-discharging pipes substantially as described.

2. An electrolytic apparatus of spheroidal shape consisting of two separate closed cells or chambers forming sections of the spheroid, with flat sides juxtaposed as described, one of which has a filling-tube with closing device, and both of which have registering openings, and an encompassing band or jacket completely encircling and holding them together, said cells being provided with electrodes, circuit-wires, and gas-discharge pipes substantially as described.

3. An electrolytic apparatus of spheroidal shape composed of two metal cells forming sections of the spheroid and having flat sides insulated from each other and electroplated interiorly to form both electrodes and holders for the gases, said chambers being in open communication with each other, separate gas-discharge pipes for the cells, and separate electrical connection for carrying the current to the same, substantially as described.

4. An electrolytic apparatus made of two metal cells having rounded exterior walls and flat adjacent and juxtaposed sides with registering openings, an insulating medium between the juxtaposed sides, separate electrical connections for the cells and a detachable clamping and retaining band or jacket surrounding the cells substantially as described.

In testimony whereof I have signed my name to this specification in the presence of two subscribing witnesses.

ANDREW PLECHER.

Witnesses:
JOHN F. McQUADE,
WILLIAM MAYER.